US011455382B2

(12) United States Patent
Embrechts et al.

(10) Patent No.: US 11,455,382 B2
(45) Date of Patent: Sep. 27, 2022

(54) METHODS AND APPARATUSES FOR PROXIMITY DETECTION

(71) Applicant: Sony Corporation, Tokyo (JP)

(72) Inventors: Hugo Embrechts, Stuttgart (DE); Gonzalo Bailador Del Pozo, Stuttgart (DE); Dimitri Torfs, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 17/040,985

(22) PCT Filed: Feb. 20, 2019

(86) PCT No.: PCT/EP2019/054159
§ 371 (c)(1),
(2) Date: Sep. 24, 2020

(87) PCT Pub. No.: WO2019/185243
PCT Pub. Date: Oct. 3, 2019

(65) Prior Publication Data
US 2021/0026938 A1 Jan. 28, 2021

(30) Foreign Application Priority Data

Mar. 26, 2018 (EP) .................................. 18164064

(51) Int. Cl.
*G06F 21/00* (2013.01)
*G06F 21/34* (2013.01)
(Continued)

(52) U.S. Cl.
CPC ............ *G06F 21/316* (2013.01); *G06F 21/34* (2013.01); *G06F 21/35* (2013.01); *G06F 21/40* (2013.01);
(Continued)

(58) Field of Classification Search
CPC . G06F 21/316; G06F 21/34; G06F 2221/2133
See application file for complete search history.

(56) References Cited

U.S. PATENT DOCUMENTS 8,583,915 B1 11/2013 Huang
2011/0202466 A1 8/2011 Carter
(Continued)

FOREIGN PATENT DOCUMENTS

EP 2395446 A1 * 12/2011 ............. G06F 21/34
JP 2017-142614 A1 8/2017
WO 2016/087541 A1 6/2016

OTHER PUBLICATIONS

Marquardt, P., Verma, A., Carter, H. and Traynor, P., Oct. 2011, (sp) iphone: Decoding vibrations from nearby keyboards using mobile phone accelerometers. In Proceedings of the 18th ACM conference on Computer and communications security (pp. 551-562). (Year: 2011).*

(Continued)

*Primary Examiner* — Alexander Lagor
(74) *Attorney, Agent, or Firm* — Xsensus, LLP (57) ABSTRACT

The present disclosure relates to a concept of proximity detection. A sequence of keystrokes is captured when a person types on a keyboard placed on a support structure. A sequence of vibrations of the support structure in response to typing on the keyboard is captured with a sensor device associated with a user or a location and in contact with the support structure in proximity to the keyboard. The proximity between the person and the sensor device is checked based on a comparison of the captured sequence of keystrokes with the captured sequence of vibrations.

13 Claims, 5 Drawing Sheets

(51) Int. Cl.
*G06F 21/31* (2013.01)
*G06F 21/35* (2013.01)
*G06F 21/40* (2013.01)
*H03K 17/945* (2006.01)
*H04W 12/63* (2021.01)

(52) U.S. Cl.
CPC .... *H03K 17/945* (2013.01); *G06F 2221/2111* (2013.01); *G06F 2221/2133* (2013.01); *H04W 12/63* (2021.01)

(56) References Cited

U.S. PATENT DOCUMENTS

2016/0371476 A1　12/2016　Turgeman et al.
2019/0227631 A1*　7/2019　Marti .................... B60K 37/06

OTHER PUBLICATIONS

International Search Report and Written Opinion dated Mar. 15, 2019, 2018 for PCT/EP2019/054159 filed on Feb. 20, 2019, 9 pages.
Gascon, H., et al., "Continuous Authentication on Mobile Devices by Analysis of Typing Motion Behavior," Mar. 2014, 12 pages.
Ginart, A., et al., "Smart Phone Machinery Vibration Measurement," Aerospace Conference, IEEE, 2011, pp. 1-7.
Philip Marquardt et al., (sp)iPhone: Decoding Vibrations From Nearby Keyboards Using Mobile Phone Accelerometers,Computer and Communications Security, ACM, 2 Penn Plaza, Suite 701 New York NY 10121-0701 USA, Oct. 17, 2011, pp. 551-562, XP058006082, DOI: 10.1145/2046707.2046771 ISBN: 978-1-4503-0948-6.

* cited by examiner

METHODS AND APPARATUSES FOR PROXIMITY DETECTION

CROSS-REFERENCE TO RELATED APPLICATIONS

The present application is based on PCT filing PCT/EP2019/054159, filed Feb. 20, 2019, which claims priority to EP 18164064.0, filed Mar. 26, 2018, the entire contents of each are incorporated herein by reference.

FIELD

The present disclosure relates to methods and apparatuses for detection of proximity between a person and a sensor device. Such methods and apparatuses can be used, among other things, for user authentication.

BACKGROUND

Signal integrity and/or user authentication is relevant to multiple fields. In computer science, for example, verifying a person's identity is often required to allow physical and/or logical access to confidential data or systems, such as micropayment systems. The ways in which someone may be authenticated fall into three categories, based on something the person knows (e.g., a password, personal identification number (PIN), challenge response (the person must answer a question, or pattern, etc.), something the person has (e.g., wrist band, ID card, security token, cell phone with built-in hardware or software token, etc.), and something the person is (e.g., fingerprint, retinal pattern, DNA sequence, signature, face, voice, unique bio-electric signals, or other biometric identifier). Authentication concepts can also combine two or more of the mentioned categories, wherein combinations usually lead to more security.

It is desired to provide signal integrity and/or user authentication concepts that provide an increased level of protection from misuse or malicious intrusion.

SUMMARY

This need is met by methods and apparatuses in accordance with the independent claims. Advantageous embodiments are addressed by the dependent claims.

According to a first aspect, the present disclosure provides a method of proximity detection. The methods includes capturing a sequence of keystrokes when a person types on a keyboard which is placed on a support structure or substrate. The method further includes capturing, with a sensor device which is associated with a user and/or a location and which is in contact with the support structure in proximity to the keyboard, a sequence of vibrations of the support structure in response to the person typing on the keyboard. The proximity between the person typing and the sensor device is checked (confirmed or not confirmed) based on a comparison of the captured sequence of keystrokes with the captured sequence of vibrations.

According to a further aspect, it is provided a system for proximity detection. The system comprises an input device with a keyboard placed on a support structure. The input device is configured to capture a sequence of keystrokes when a person types on the keyboard. A sensor device is in contact with the support structure in proximity to the keyboard. The sensor device is associated with a user or a location and is configured to capture a sequence of vibrations of the support structure in response to the person typing on the keyboard. Control circuitry is configured to check the proximity between the person and the sensor device based on a comparison of the captured sequence of keystrokes with the captured sequence of vibrations.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

The example embodiments described in the present disclosure can be used as an additional factor for authentication which is based on the proximity between two different devices. It can be used on its own or together with other authentication factors (e.g., knowledge factors, possession factors, other biometrics) to achieve a frictionless way to authenticate people.

Figure 1:
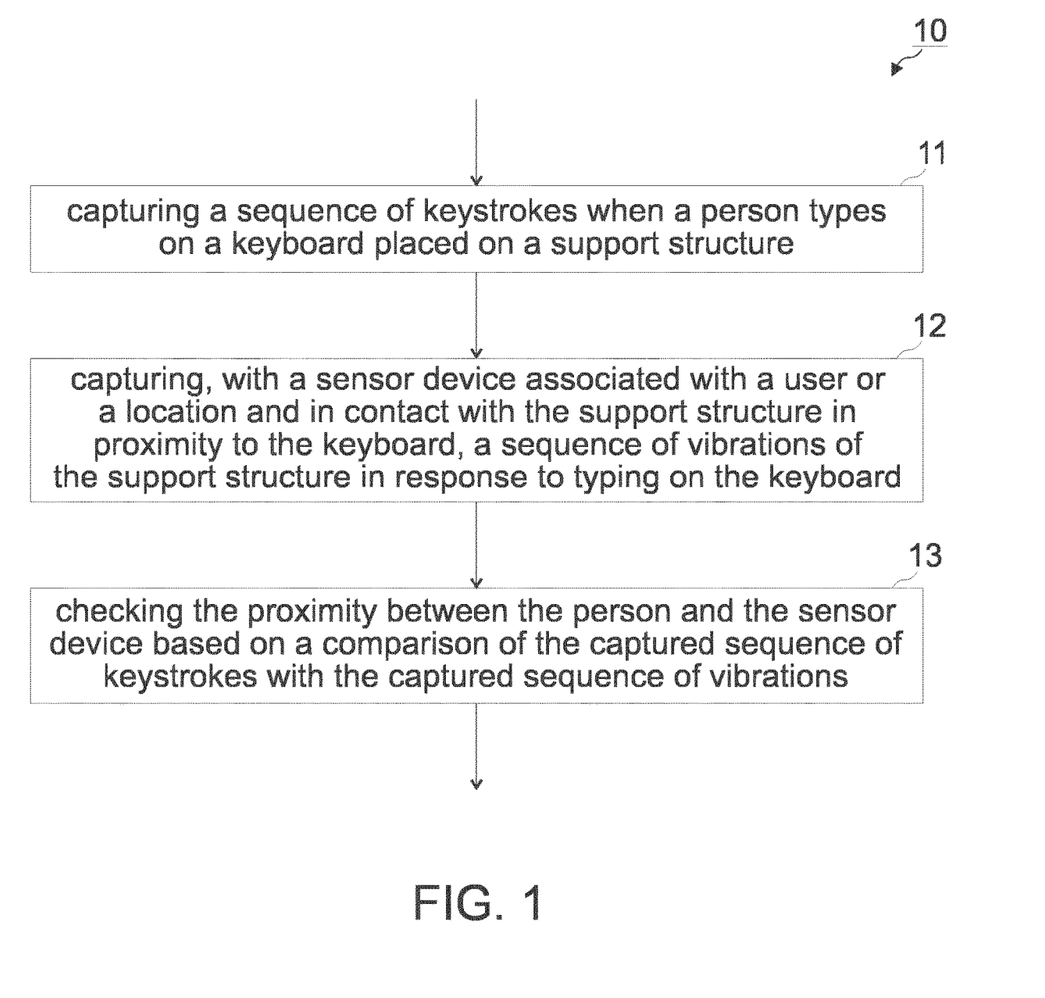
FIG. 1 shows a schematic flow chart of a proximity detection method according to an embodiment.

FIG. 1 shows a schematic flowchart of a basic method 10 of proximity detection.

Method 10 includes an act 11 of capturing a sequence of keystrokes when a person types on a keyboard which is placed on a support structure. The method 10 further includes an act 12 of capturing a sequence of vibrations of the support structure due to the person typing on the keyboard. Thereby the sequence of vibrations is captured or detected via a sensor device which is associated with a certain user (which could be the person typing or another user) and/or a specific location. The user- or location-specific sensor device is in contact with the support structure in proximity to the keyboard such that it can detect vibrations of the support structure. Method 10 further includes an act 13 of checking or verifying the proximity between the person and the sensor device based on a comparison of the captured sequence of keystrokes with the captured sequence of vibrations.

When the person types on the keyboard this will inevitably cause mechanical vibrations which are conveyed from the keyboard to the support structure and are conveyed further from the support structure to the nearby sensor device. The vibrations reflect the rhythm of keystrokes during typing. The intensity of vibrations reaching the sensor device will—among others—also depend on the characteristics (e.g. material) of the support structure.

The support structure carrying the keyboard should be constructed to sufficiently convey such vibrations to the sensor device. An example of the support structure would be a table or, to be more specific, a table top on which the keyboard or another device including the keyboard (e.g. a PC, laptop computer, a tablet PC or any other device with a soft or hard keyboard) is placed. Other examples of the support structure would be beds or couches.

The sensor device should be sensitive enough to detect the conveyed vibrations. For example, sensors available in nowadays mobile phones are typically sensitive enough for this purpose. The sensor device can include a vibration sensor, such as an accelerometer, for example. The sensor device can be included in a personal or trusted device associated with a user. Here, "associated with a user" can be understood as belonging to the person, meaning that the person can be identified as being the user associated with the sensor device based on the sensor device or another user- or location-specific device including a vibration sensor. Examples of user-specific or personal devices are smartphones, tablet PCs, or similar portable and personal communication devices, which can be assigned to a person via a Personal Identification Number (PIN) of a subscriber identification module (SIM) or other personal identifiers. Such portable personal communication devices can be placed on the support structure (e.g., a table) in close proximity to the keyboard in order to detect vibrations upon typing on the keyboard.

Another option would be that the vibration sensor device is associated with a specific location (e.g., a trusted location). For example, the sensor device could be installed in a specific building or a specific room. More specifically, the sensor device could be loosely or fixedly installed in or at the support structure such that it can detect vibrations originating from the keyboard via the support structure.

In some examples, act 13 includes confirming the proximity between the person typing and the sensor device if a captured sequence of vibration peaks temporally corresponds to a captured sequence of keystroke pulses. Typically, every keystroke on the keyboard causes an electrical signal or an electrical signal pulse. The temporal sequence of these signal pulses can be monitored or captured. For example, this can be done by a computer which is coupled with the keyboard. At the same time the vibrations caused by the sequence of keystrokes can be monitored by the personal sensor device, e.g. a smartphone. This will result in a vibration sensor signal having minima and maxima. The courses of the keyboard signal and the vibration sensor signal can be compared. If their correlation is above a predefined threshold it can be decided that they match and thus that the device are close to each other. If it is below that threshold it can be decided that they do not match.

In some examples, act 13 can be performed by a processor that comprises an input configured to receive information indicative of the sequence of keystrokes captured while typing on the keyboard, and an input configured to receive, from the sensor device, information indicative of a sequence of captured vibrations of the support structure in response to typing on the keyboard. Thus, this processor can be coupled to the keyboard and/or the sensor device via a wired or a wireless communication interface. In some examples, the processor can be comprised of a computer including the keyboard, the sensor device, or a remote authentication server which can be connected with a computer and the attached keyboard as well as with the sensor device via a network, such as the Internet, for example. Thus, information indicative of the captured sequence of keystrokes and/or the captured sequence of vibrations can be sent to either a computer, the sensor device, or a remote comparison server, e.g. for authentication purposes.

Thus, in some embodiments, a computer can take input from a typing user through a keyboard and can derive from that a time sequence of typing events. The computer can be a PC or a tablet or any other device with a soft or hard keyboard. The sensor device can be a personal device that captures vibrations from this typing (passed on through the common support structure between keyboard and sensor device). An entity can match the sequence of vibrations with the typing events sequence. In different embodiments, depending on an employed authentication scenario, this entity can either be the computer, a remote service or the personal device. To do this matching the entity receives the typing events sequence and the sequence of vibrations.

In some embodiments, the person can get authenticated if the proximity between the person and the sensor device is confirmed. The proximity of the personal device to the person typing on the keyboard makes it likely that the person typing is the person owning the personal device. In various authentication scenarios the identity being confirmed is that of the owner of/user associated with the personal device. In some scenarios, the personal device can bring in more evidence that the owner of the device is near, for example through evaluating "behaviometrics" on the personal device. Behaviometrics can offer a new generation of information security solutions simply by using an individual itself as its core asset. This technique can be exploited by analyzing and measuring characteristics of the human behavior for verification purposes. For example, by analyzing how the person works with the keyboard (typing rhythm) it is possible to recognize and confirm the identity of a person.

There are several authentication scenarios to which embodiments of the present disclosure can be applied:

A computer (e.g. comprising the keyboard) gives access to the person typing.

A computer accesses over a network a remote service (session possibly initiated by the person typing). The authentication gives the remote service authentication evidence of the person typing.

A computer accesses over a local network (such as a Wireless Local Area Network, WLAN) another device in the neighbourhood.

In some examples, an authentication status of the person can be transferred from or to the sensor device if the proximity between the person and the sensor device has been confirmed. Such examples relate to so-called "hopping authentication". For example, a person is authenticating into a system while his/her personal communication device (e.g. smartphone) including the vibration sensor is on the table. In all three above cases an authentication on the computer can be strengthened with hopping of authentication from the personal device to the computer in that the personal device can build up an internal authentication score/probability by gathering evidence that the person is near, for example with behaviometrics. The transfer of the authentication score from personal device to computer could be done by some secure communication between the two. Alternatively, the authentication score of the personal device can be gathered in an authentication service in the cloud, which would be facilitating authentication scenarios between devices.

In another example, authentication on the personal device can be strengthened with hopping of authentication from the computer to the personal device in that the computer builds up an internal authentication score by gathering evidence that the personal device is near. Again various possible cases:

The person typing on the computer (including the keyboard) also accesses the personal device. The authentication can control this access.

The personal device accesses a remote service. The remote service authenticates the person typing on the computer.

The personal device accesses over a local network another device in the neighbourhood. The other device authenticates the person typing on the computer.

For each of the example authentication scenarios the authentication can either be a onetime authentication, a continuous authentication (if the described proximity mechanism is regularly executed), or a continuation of a previous (recent) authentication (e.g. the person typing keeps access to the computer as long as her personal device stays near).

In various authentication schemes, the proximity can have different roles:

The proximity is the only evidence for authentication (low security)

The proximity is one of multiple factors contributing to the authentication (as in a "multifactor authentication").

For various authentication scenarios to be secure, trust relationships can be established. For example, the personal device can be registered as a user's personal device in some way.

In some examples where the proximity is one of multiple factors contributing to the authentication, the sequence of keystrokes can be captured while the person is typing authentication information via the keyboard. The person can then be authenticated if the captured sequence of keystrokes corresponds to predefined authentication information, and a captured sequence of vibration peaks temporally corresponds to a captured sequence of keystroke pulses.

In such examples, the possession of the user-specific sensor device (e.g. smartphone) close to the keyboard can be regarded as a second factor authentication. It is thus proposed that the user-specific sensor device or smartphone is close to a place where the person is authenticating. It is assumed that the smartphone including the vibration sensor is not stolen or handed over to somebody else. In other words, it is assumed that the identity of the user associated with the sensor device corresponds to the identity of the person that needs to be confirmed. Also another authentication mechanism could be in use that confirms whether or not the smartphone is on the body of the user with whom the sensor device is associated. In the latter case the smartphone could measure a body parameter, such as heart rate or temperature, as a third factor for authentication, for example.

In some examples, the person can be kept authenticated (after successful initial authentication) as long as a captured sequence of vibration peaks temporally matches a sequence of keystroke pulses captured during a communication session. Such a continuous monitoring and comparison of keystrokes and resulting vibrations during the communication session can further increase the security level.

Figure 2:
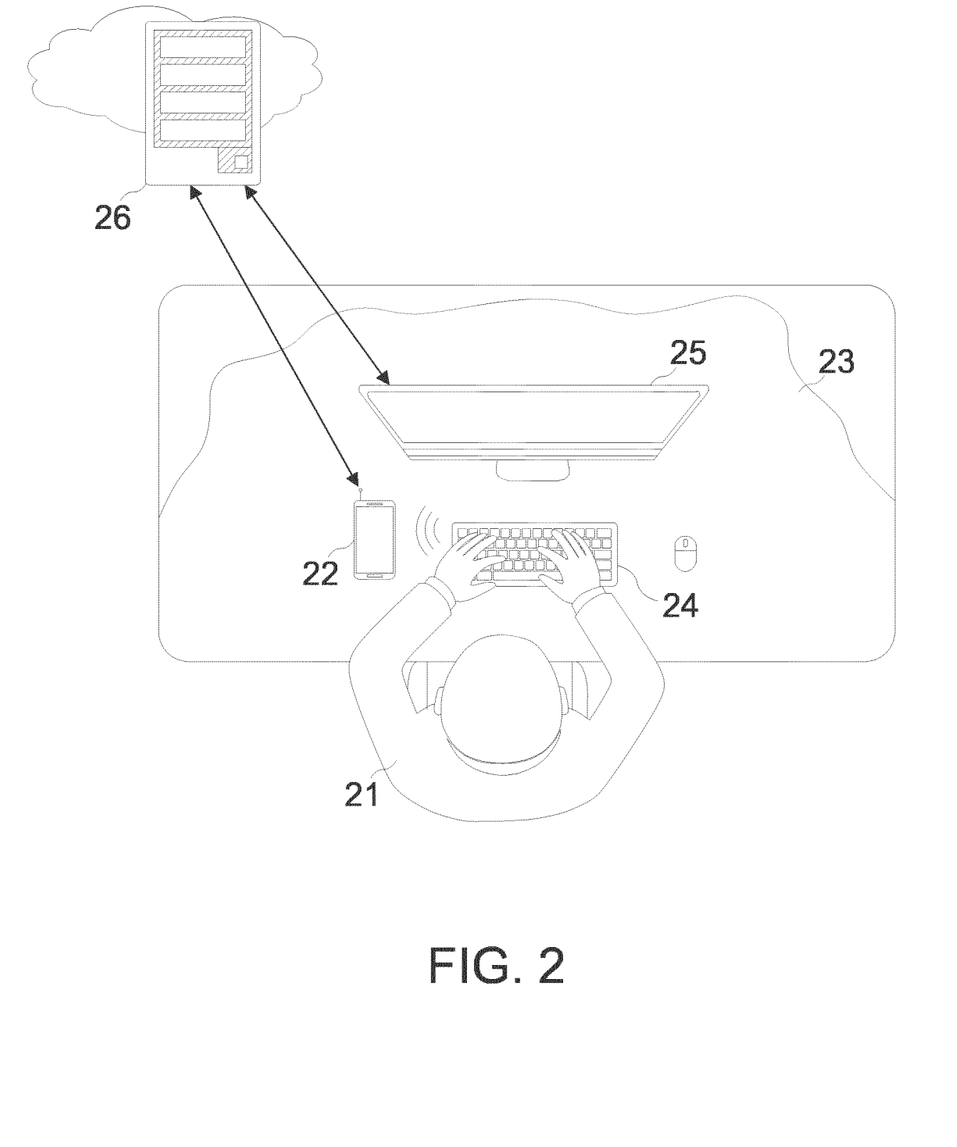
FIG. 2 shows a system for proximity detection according to an embodiment.

FIG. 2 illustrates an example scenario how embodiments of the present disclosure can be applied.

A person 21 places his associated personal communication device 22 on a table 23 next to a keyboard 24 which is coupled to a computer 25 via a wireless or wired link. The person 21 types on the keyboard 24, for example for accessing an web-service or the like. This webservice can be accessed via predefined authentication information such as a user name and/or a personal password. The person's typing is detected by the personal communication device 22 and by the keyboard 24 at the same time.

The skilled person having benefit from the present disclosure will appreciate that due to privacy issues it is not mandatory to capture the actual keys (e.g. "q", "w", "e", etc.) the person 21 presses. Instead, it may be sufficient to capture the time a key is pressed and/or released, leading to a time sequence of keystrokes. An example of a time sequence 31 of keystrokes (or a corresponding electrical signal) is sketched in FIG. 3A. For example, a remote server 26 or the computer 25 could ask permission to the person for logging the keys pressed. Capturing the time sequence 31 of keystrokes can be done via a web application capturing the keys pressed during login or by means of any another type of key-logger. The captured/monitored time sequence of keystrokes or information indicative thereof can then be send to a (remote) comparison server 26.

Figure 3A:
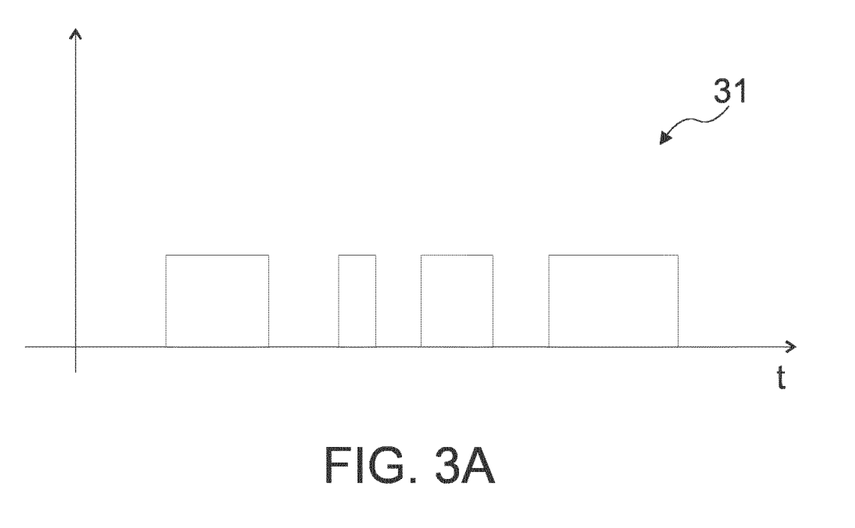
FIG. 3A, B show keystroke and vibration signals.
Figure 3B:
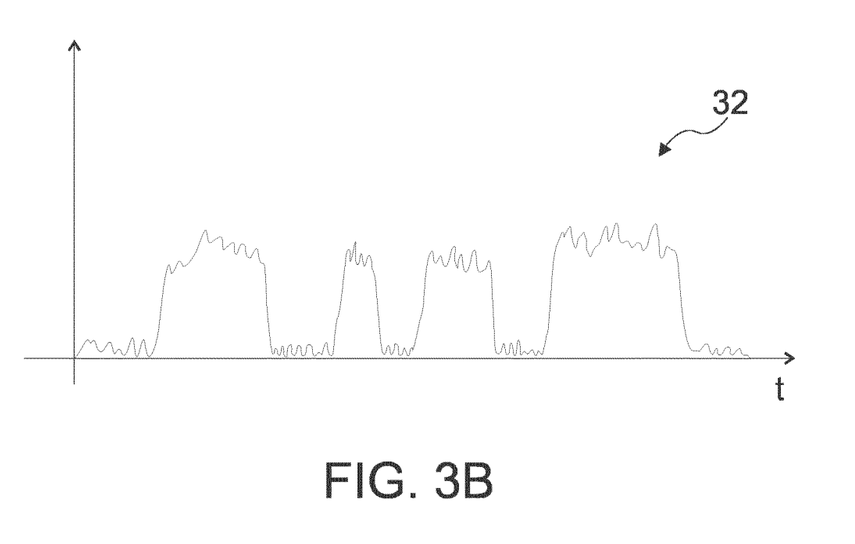

At the same time the user's personal communication device 22 placed on the table or desk 23 can detect the vibrations of the table 23 due to the keystrokes via a built-in acceleration sensor. The captured acceleration data can then also be send to comparison server 26, e.g. via a wireless interface in accordance with a present or future wireless communications standard. FIG. 3B sketches an example of a captured acceleration signal 32. In an example embodiment, the person 21 could be asked to place the personal communication device 22 on the table 23 while typing on the keyboard 24. If the personal communication device 22 is not on the table no vibrations can be detected and thus the authentication will fail. The personal communication device 22 could be configured to permanently log acceleration data while being placed on the table 23.

In an alternative embodiment the acceleration or vibration sensor could also be built into the table 23 and be uniquely associated with the table 23. This would be an example of a location-specific sensor device. Such embodiments can also provide an additional level of security over conventional art.

Both signals 31, 32 corresponding to the time sequence of keystrokes and the captured acceleration can be compared at comparison server 26. Note, however, that the signals 31, 32 can be of different nature. While we could have timestamps from the keyboard 24, we could have acceleration samples from the personal communication device 22. Thus, the comparison server 26 could be configured to determine peaks from the acceleration data, to extract timestamps of the peaks, and to compare the latter to the timestamps of the keyboard 24. In another example, the comparison server 26 could be configured to covert each captured keystroke pulse to a Gaussian pulse and to correlate the resulting sequence of Gaussian pulses with the captured acceleration data.

Figure 4:
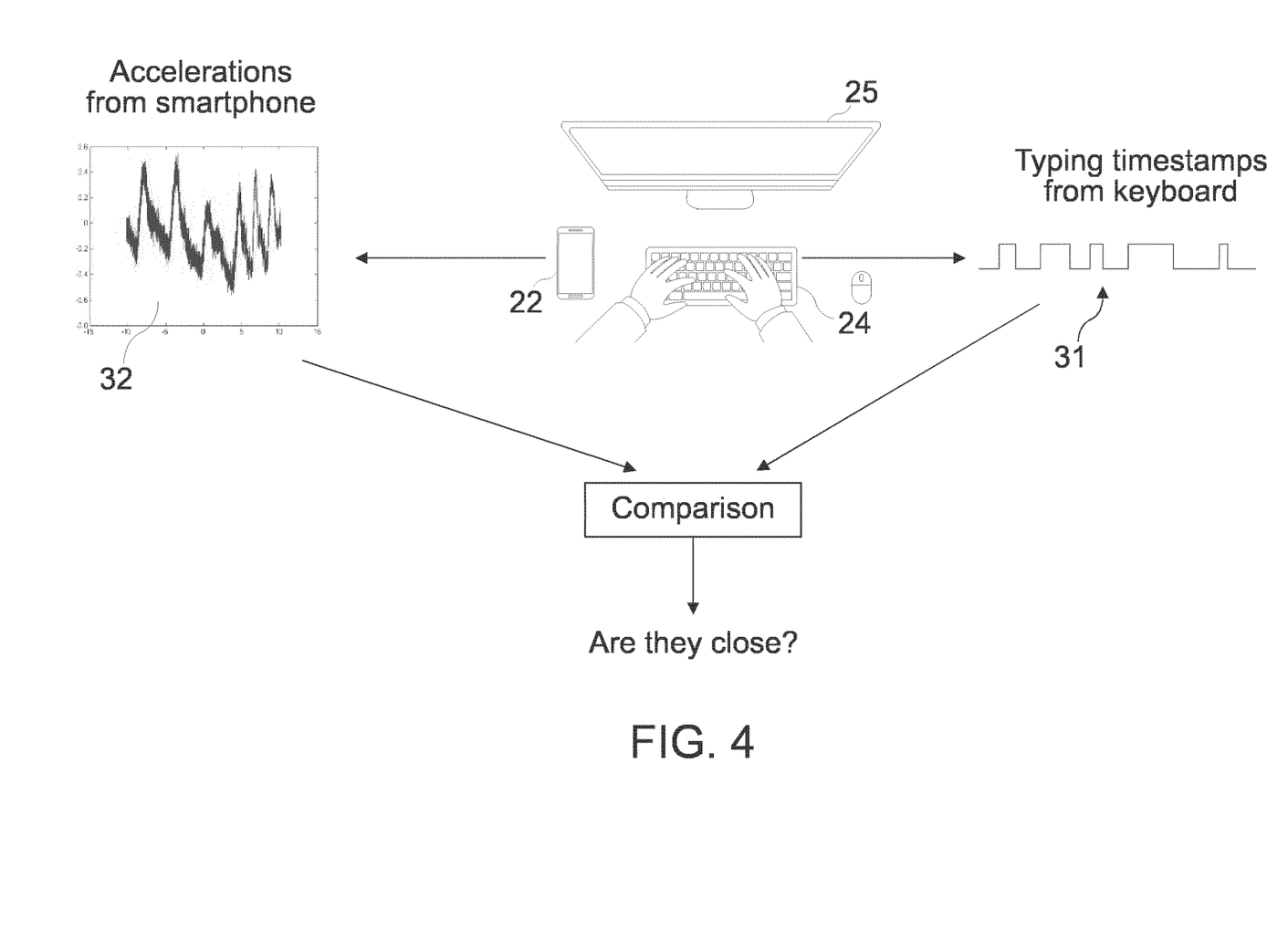
FIG. 4 summarizes an example concept of proximity detection.

The comparison process is summarized in FIG. 4. The acceleration signal 32 measured by the personal communication device 22 or its acceleration sensor is compared with the sequence 31 of keystrokes from the keyboard 24. Based on the comparison of both signals its is decided whether the user's personal communication device 22 and the keyboard 24 are close. If yes, the person can be authenticated, or authentication can be transferred between the devices, for example.

Typically, authentication succeeds if several authentication factors confirm that the identity of the person 21 corresponds to the user that needs to be authenticated. None of these factors brings perfect knowledge, but instead they can all increase the likelihood that the person 21 is present. This is typically expressed with a confidence score. The overall confidence score can be derived from confidence scores associated with the different authentication factors, either in a heuristic way or based on statistical reasoning. Here, it is proposed that one of the factors used for an authentication on computer 25 can be the proximity between the computer 25/keyboard 24 and the personal communication device 22 of the person 21. The confidence score of the computer authentication can be increased when such a proximity is confirmed. In some examples it is also possible that the personal communication device 22 also runs an authentication mechanism that confirms that the personal communication device 22 is near the person 21. In this case the authentication score on the computer authentication can depend on the confidence score reached on the smartphone.

Figure 5:
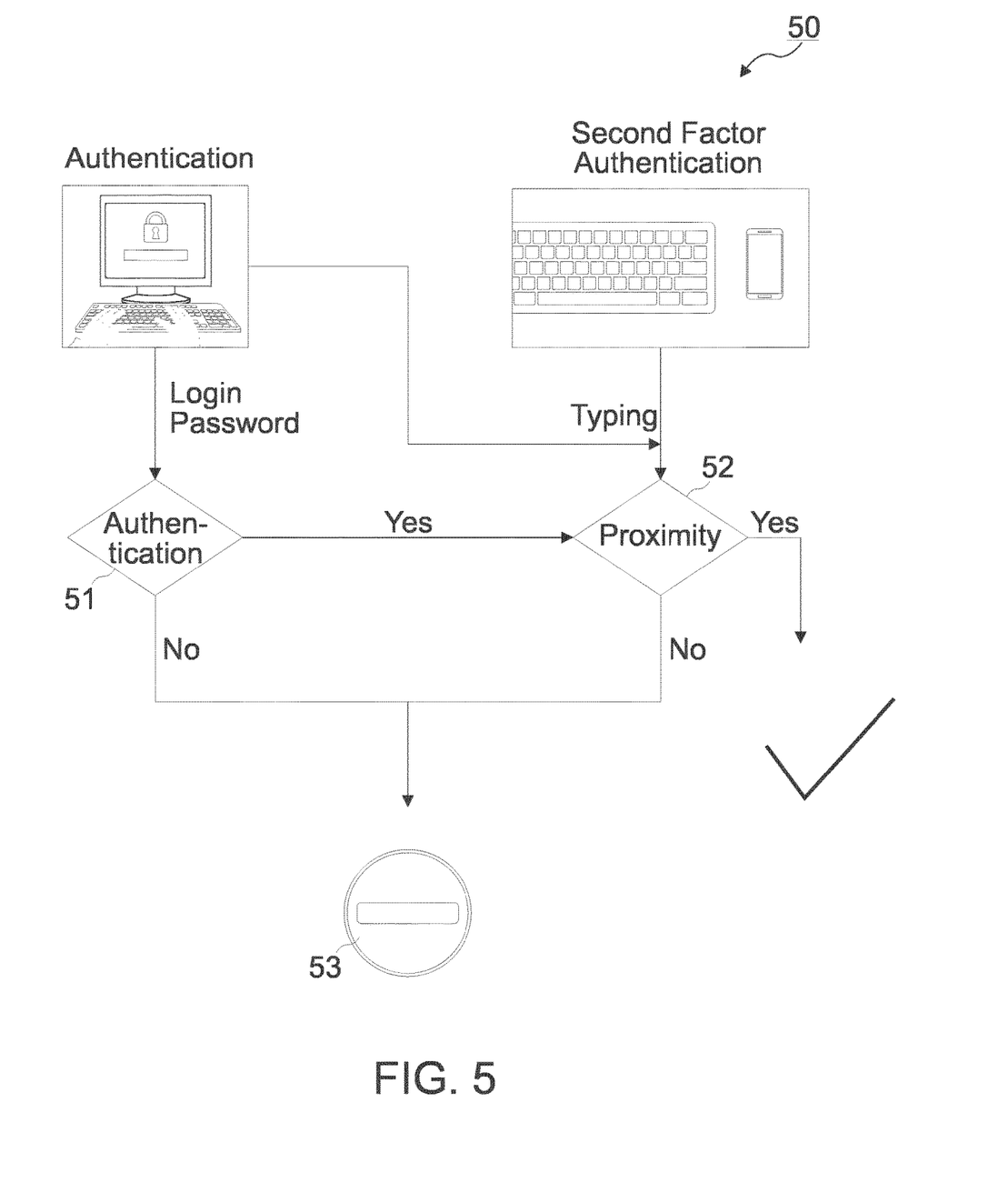
FIG. 5 shows an example authentication process.

An example multi-factor authentication process 50 is schematically shown in FIG. 5.

A first authentication factor or level is determined by predefined authentication information including a login (user name) and/or a password. It is checked whether the captured sequence of keystrokes corresponds to this predefined authentication information, see act 51. If yes, the authentication process 50 can continue to the second factor/level, the proximity check 52. If no, the authentication fails, see reference numeral 53. During the proximity check 52 it is checked whether a captured sequence of vibration peaks (coming from the smartphone) temporally corresponds to a captured sequence of keystroke pulses (from the keyboard). If yes, it can be concluded that both devices are close and authentication is correct. Otherwise authentication fails.

To summarize, the proposed idea comprises in detecting the typing on the computer keyboard on two different devices,
on a keyboard, capturing the times when the keys are pressed and released,
on personal communication device (e.g., smartphone), using an accelerometer to capture the vibrations of the support structure due to key pressing.

Both signals can be sent to a server to compare them (or from one device to the other). The comparison of both signals can be calculated. If they are similar, then the personal communication device was close to the place where the person was typing. If they are not, the personal communication device and the keyboard are not close.

In other words, some examples propose a concept for performing multi-factor authentication using a personal communication device placed in proximity to a keyboard. The concept comprises capturing timestamps when the keys on the keyboard are pressed and released, capturing vibrations of a table due to key pressing, using an accelerometer of the personal communication device. The signals obtained from the keyboard and the smartphone are compared (on a server or either device) to authenticate the person. For example, the comparison can be performed between the acceleration peaks and the timestamps of the peaks. For another example, the timestamps can be converted in time series with the timestamps as Gaussian and the resultant can be correlated with the acceleration data.

The following examples pertain to further embodiments.
(1) A method of proximity detection The method comprises capturing a sequence of keystrokes when a person types on a keyboard placed on a support structure, capturing, with a sensor device associated with a user or a location and being in contact with the support structure in proximity to the keyboard, a sequence of vibrations of the support structure in response to typing on the keyboard, and checking the proximity between the person and the sensor device based on a comparison of the captured sequence of keystrokes with the captured sequence of vibrations.

(2) The method of (1), wherein checking the proximity comprises confirming the proximity between the person and the sensor device if a captured sequence of vibration peaks temporally corresponds to a captured sequence of keystroke pulses.

(3) The method of any one of (1) to (2), further comprising authenticating the person as the user associated with the sensor device if the proximity between the person and the sensor device is confirmed.

(4) The method of any one of (1) to (3), wherein the sequence of keystrokes is captured when typing authentication information via the keyboard, and wherein the method further comprises authenticating the person as the user associated with the sensor device if the captured sequence of keystrokes corresponds to predefined authentication information and if a captured sequence of vibration peaks temporally corresponds to a captured sequence of keystroke pulses.

(5) The method of (4), further comprising keeping the person authenticated as long as a captured sequence of vibration peaks temporally matches a sequence of keystroke pulses captured during a communication session.

(6) The method of any one of (1) to (5), further comprising transferring an authentication status of the person to the sensor device if the proximity between the person and the sensor device is confirmed.

(7) The method of any one of (1) to (6), further comprising sending information indicative of the captured sequence of keystrokes and the captured sequence of vibrations to a remote server.

(8) The method of any one of (1) to (7), wherein the sequence of keystrokes is captured with an accelerometer of the sensor device.

(9) The method of any one of (1) to (8), wherein the sensor device is integrated in the support structure.

(10) The method of any one of (1) to (8), wherein the sequence of keystrokes is captured with a mobile communication device associated with a user.

(11) The method of (10), wherein the mobile communication device is a smartphone or tablet PC belonging to a user.

(12) The method of any one of (1) to (11), wherein the support structure for the keyboard is a table top.

(13) The method of any one of (1) to (12), wherein checking the proximity between the person and the sensor device is one of at least two factors contributing to an authentication of the person.

(14) A proximity detection device, comprising an input configured to receive information indicative of a sequence of keystrokes captured while typing on a keyboard placed on a support structure, an input configured to receive, from a sensor device associated with a user or a location and being in contact with the support structure in proximity to the keyboard, information indicative of a sequence of captured vibrations of the support structure in response to typing on the keyboard, and a processor configured to check the proximity between the person and the sensor device based on a comparison of the captured sequence of keystrokes with the captured sequence of vibrations.

(15) The proximity detection device of (14), wherein the proximity detection device comprises an authentication server.

(16) The proximity detection device of (15), wherein the authentication server is configured to authenticate the person if a captured sequence of keystrokes pulses matches a captured sequence of vibrations peaks.

(17) A system for proximity detection, the system comprising an input device comprising a keyboard placed on a support structure, wherein the input device is configured to capture a sequence of keystrokes when typing on the keyboard, a sensor device being in contact with the support structure in proximity to the keyboard, wherein the sensor device is associated with a user or a location and configured to capture a sequence of vibrations of the support structure in response to the typing on the keyboard, and control circuitry configured to check the proximity between the person and the sensor device based on a comparison of the captured sequence of keystrokes with the captured sequence of vibrations.

(18) The system of (17), wherein the control circuitry is comprised of a remote server, wherein the sensor device is configured to send information indicative of the captured sequence of vibrations to the remote server, and wherein the input device is configured to send information indicative of the captured sequence of keystrokes to the remote server.

(19) The system of (17) or (18), wherein the sensor device is a smartphone or tablet PC belonging to the person and comprising an accelerometer to measure vibrations.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method of proximity detection, comprising:
   capturing a sequence of keystrokes when a person types on a keyboard placed on a support structure;
   capturing, with a sensor device associated with a user or a location and in contact with the support structure in proximity to the keyboard, a sequence of vibrations of the support structure in response to the typing of the sequence of keystrokes on the keyboard;
   checking proximity between the person and the sensor device based on a comparison of the captured sequence of keystrokes with the captured sequence of vibrations, wherein said checking the proximity includes confirming the proximity between the person and the sensor device when a captured sequence of vibration peaks temporally corresponds to a captured sequence of keystroke pulses;

authenticating the person as the user associated with the sensor device under a condition that the proximity between the person and the sensor device is confirmed and based on behaviometrics in the form of typing rhythm of the captured sequence of keystrokes; and keeping the person authenticated as long as one or more post-authentication captured sequences of vibration peaks temporally matches a corresponding one or more post-authentication sequences of keystroke pulses captured during a communication session.

2. The method of claim 1,
wherein the sequence of keystrokes is captured when typing authentication information via the keyboard, and
wherein the method further comprises performing said authenticating the person as the user associated with the sensor device when the captured sequence of keystrokes corresponds to predefined authentication information and when a captured sequence of vibration peaks temporally corresponds to a captured sequence of keystroke pulses.

3. The method of claim 1, further comprising transferring an authentication status of the person from or to the sensor device when the proximity between the person and the sensor device is confirmed.

4. The method of claim 1, further comprising sending information indicative of the captured sequence of keystrokes and the captured sequence of vibrations to a remote server.

5. The method of claim 1, wherein the sequence of keystrokes is captured with an accelerometer of the sensor device.

6. The method of claim 1, wherein the sensor device is integrated in the support structure.

7. The method of claim 1, wherein the support structure for the keyboard is a table top.

8. The method of claim 1, wherein said checking the proximity between the person and the sensor device is one of at least two factors contributing to the authentication of the person, checking the behaviometrics in the form of the typing rhythm of the captured sequence of keystrokes being another of the factors contributing to the authentication of the person.

9. A proximity detection device, comprising:
an input configured to receive information indicative of a sequence of keystrokes captured while typing on a keyboard placed on a support structure;
an input configured to receive, from a sensor device associated with a location and in contact with the support structure in proximity to the keyboard, information indicative of a sequence of captured vibrations of the support structure in response to the typing of the sequence of keystrokes on the keyboard; and
a processor configured to
check proximity between the person and the sensor device based on a comparison of the captured sequence of keystrokes with the captured sequence of vibrations, wherein the checking the proximity includes confirming the proximity between the person and the sensor device when a captured sequence of vibration peaks temporally corresponds to a captured sequence of keystroke pulses,
authenticate the person as the user associated with the sensor device under a condition that the captured sequence of keystrokes pulses matches the captured sequence of vibrations peaks, and
keep the person authenticated as long as one or more post-authentication captured sequences of vibration peaks temporally matches a corresponding one or more post-authentication sequences of keystroke pulses captured during a communication session and based on behaviometrics in the form of typing rhythm of the captured sequence of keystrokes.

10. The proximity detection device of claim 9, wherein the proximity detection device comprises an authentication server.

11. A system for proximity detection, the system comprising:
an input device comprising a keyboard placed on a support structure, wherein the input device is configured to capture a sequence of keystrokes when typing on the keyboard;
a sensor device in contact with the support structure in proximity to the keyboard, wherein the sensor device is associated with a user and configured to capture a sequence of vibrations of the support structure in response to the typing of the sequence of keystrokes on the keyboard; and
control circuitry configured to
check proximity between the person and the sensor device based on a comparison of the captured sequence of keystrokes with the captured sequence of vibrations, wherein the checking the proximity includes confirming the proximity between the person and the sensor device when a captured sequence of vibration peaks temporally corresponds to a captured sequence of keystroke pulses,
authenticate the person as the user associated with the sensor device under a condition that the proximity between the person and the sensor device is confirmed and based on behaviometrics in the form of typing rhythm of the captured sequence of keystrokes, and
keep the person authenticated as long as one or more post-authentication captured sequences of vibration peaks temporally matches a corresponding one or more post-authentication sequences of keystroke pulses captured during a communication session and based behaviometrics in the form of typing rhythm of the captured sequence of keystrokes.

12. The system of claim 11,
wherein the control circuitry is comprised of a remote server,
wherein the sensor device is configured to send information indicative of the captured sequence of vibrations to the remote server, and
wherein the input device is configured to send information indicative of the captured sequence of keystrokes to the remote server.

13. The system of claim 11, wherein the sensor device is a smartphone or tablet PC belonging to the person and comprising an accelerometer to measure vibrations.

* * * * *